US006589115B2

(12) United States Patent
Walker et al.

(10) Patent No.: US 6,589,115 B2
(45) **Date of Patent: *Jul. 8, 2003**

(54) GAMING METHOD AND APPARATUS HAVING A PROPORTIONAL PAYOUT

(75) Inventors: Jay S. Walker, Ridgefield, CT (US); James A. Jorasch, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/782,998

(22) Filed: Feb. 14, 2001

(65) Prior Publication Data

US 2001/0007828 A1 Jul. 12, 2001

Related U.S. Application Data

(63) Continuation of application No. 08/947,243, filed on Oct. 8, 1997, now Pat. No. 6,213,877.

(51) Int. Cl.[7] .......................... A63F 13/00; A63F 9/24; G06F 17/00; G06F 19/00

(52) U.S. Cl. ............................ 463/25; 463/16; 463/20; 463/21; 463/26; 463/27; 273/138.1; 273/139

(58) Field of Search ............................ 463/26, 13, 12, 463/16, 17, 18, 19, 20, 21, 23, 25, 27, 7, 29, 31, 42, 22; 273/138.1, 139, 143 R, 148 A; 700/232, 90, 91, 92, 93, 231; 705/16, 17, 20, 21

(56) References Cited

U.S. PATENT DOCUMENTS 3,269,503 A * 8/1966 Foster .......................... 194/1
3,439,281 A * 4/1969 McGuire et al. ............ 328/153
3,642,287 A * 2/1972 Lally et al. ............ 273/143 R
3,684,290 A * 8/1972 Wayne .................. 273/143 C
3,834,712 A * 9/1974 Cox ...................... 273/143 R
3,841,456 A * 10/1974 Levasseur .................. 194/1 N
4,095,795 A * 6/1978 Saxton et al. ........ 273/143 R X
4,448,419 A 5/1984 Telnaes
4,508,345 A 4/1985 Okada
4,652,998 A * 3/1987 Koza et al. ............ 364/412 X
4,669,731 A * 6/1987 Clarke ............... 273/143 R X
4,856,787 A * 8/1989 Itkis ...................... 273/237 X
4,958,835 A * 9/1990 Tashiro et al. ........ 273/85 G X
5,042,818 A * 8/1991 Weingardt ............. 273/292 X
5,102,134 A 4/1992 Smyth
5,123,649 A * 6/1992 Tiberio ................... 273/143 R
5,170,345 A * 12/1992 Poole ..................... 364/410 X
5,178,390 A * 1/1993 Okada .................... 273/143 R
5,251,897 A * 10/1993 Fulton ............... 273/85 CP X
5,282,620 A * 2/1994 Keesee ................... 273/138 A
5,286,023 A * 2/1994 Wood ..................... 273/138 A
5,294,120 A * 3/1994 Schultz .............. 273/85 CP X
5,401,023 A * 3/1995 Wood ................ 273/85 CP X
5,401,024 A * 3/1995 Simunek ............ 273/138 A X
5,494,287 A * 2/1996 Manz ..................... 273/143 R
5,511,781 A * 4/1996 Wood et al. ........ 273/85 CP X
5,511,784 A * 4/1996 Furry et al. ............ 273/143 R
5,513,851 A * 5/1996 Harris ....................... 273/274
5,524,888 A 6/1996 Heidel
5,531,441 A * 7/1996 Dabrowski et al. ....... 463/12 X
5,766,075 A * 6/1998 Cook et al. .................. 463/25
5,456,465 A 10/1995 Durham (List continued on next page.)

*Primary Examiner*—Valencia Martin-Wallace
*Assistant Examiner*—Binh-An D. Nguyen
(74) *Attorney, Agent, or Firm*—Magdalena M. Fincham

(57) ABSTRACT

A gaming machine such as a slot machine is provided having a payout proportional to a wager value. The gaming machine provides a player with the ability to flexibly and automatically increase and decrease wagers, thereby allowing the player to press his bets when he feels lucky, and to decrease his bets when he feels unlucky. Different proportional payout tables are provided for different levels of wagers.

48 Claims, 11 Drawing Sheets

160

| | COMBINATION 132 | EXPECTED HITS PER CYCLE 134 | PROPOR-TIONAL PAYOUT 164 | PLAYER WIN/(LOSS) 166 |
|---|---|---|---|---|
| 162a | NONWINNING COMBINATION | 8570 | (0.2) | (1714.0) |
| 162b | CHERRY/ANY/ANY | 680 | 130% | 204.0 |
| 162c | ANY/ANY/CHERRY | 680 | 130% | 204.0 |
| 162d | CHERRY/CHERRY/ANY | 200 | 160% | 120.0 |
| 162e | ANY/CHERRY/CHERRY | 200 | 160% | 120.0 |
| 162f | CHERRY/ANY/CHERRY | 68 | 160% | 40.8 |
| 162g | CHERRY/CHERRY/CHERRY | 20 | 300% | 40.0 |
| 162h | BAR/ORANGE/ORANGE | 42 | 175% | 31.5 |
| 162i | ORANGE/ORANGE/BAR | 6 | 175% | 4.5 |
| 162j | ORANGE/ORANGE/ORANGE | 42 | 300% | 84.0 |
| 162k | BAR/PLUM/PLUM | 20 | 175% | 15.0 |
| 162l | PLUM/PLUM/BAR | 5 | 175% | 3.75 |
| 162m | PLUM/PLUM/PLUM | 50 | 300% | 100.0 |
| 162n | BAR/BELL/BELL | 4 | 200% | 4.0 |
| 162o | BELL/BELL/BAR | 20 | 200% | 20.0 |
| 162p | BELL/BELL/BELL | 20 | 300% | 40.0 |
| 162q | BAR/BAR/BAR | 20 | 750% | 130.0 |
| 162r | 7/7/7 | 1 | 1,000% | 9.0 |

U.S. PATENT DOCUMENTS 5,851,010 A * 12/1998 Feinberg ................. 273/274 X
5,851,147 A * 12/1998 Stupak et al. ................. 463/13
5,879,234 A * 3/1999 Mengual ................... 463/20 X
5,934,672 A * 8/1999 Sines et al. .......... 273/143 R X
5,938,196 A * 8/1999 Antoja ............... 273/143 C X
5,947,821 A * 9/1999 Stone ....................... 463/13 X
5,971,850 A * 10/1999 Liverance ................. 463/23 X
6,113,492 A * 9/2000 Walker et al. ............ 463/16 X
6,113,493 A * 9/2000 Walker et al. ............ 463/25 X
6,123,333 A * 9/2000 McGinnis, Sr. et al. 273/146 X
6,213,877 B1 * 4/2001 Walker et al. ................ 463/22

* cited by examiner

126

| | RANDOM NUMBER 130 | COMBINATION 132 | EXPECTED HITS PER CYCLE 134 |
|---|---|---|---|
| 128a | 1-8570 | NONWINNING COMBINATION | 8570 |
| 128b | 8571-9250 | CHERRY/ANY/ANY | 680 |
| 128c | 9251-9930 | ANY/ANY/CHERRY | 680 |
| 128d | 9931-10130 | CHERRY/CHERRY/ANY | 200 |
| 128e | 10131-10330 | ANY/CHERRY/CHERRY | 200 |
| 128f | 10331-10398 | CHERRY/ANY/CHERRY | 68 |
| 128g | 10399-10418 | CHERRY/CHERRY/CHERRY | 20 |
| 128h | 10419-10460 | BAR/ORANGE/ORANGE | 42 |
| 128i | 10461-10466 | ORANGE/ORANGE/BAR | 6 |
| 128j | 10467-10508 | ORANGE/ORANGE/ORANGE | 42 |
| 128k | 10509-10528 | BAR/PLUM/PLUM | 20 |
| 128l | 10529-10533 | PLUM/PLUM/BAR | 5 |
| 128m | 10534-10583 | PLUM/PLUM/PLUM | 50 |
| 128n | 10584-10587 | BAR/BELL/BELL | 4 |
| 128o | 10588-10607 | BELL/BELL/BAR | 20 |
| 128p | 10608-10627 | BELL/BELL/BELL | 20 |
| 128q | 10628-10647 | BAR/BAR/BAR | 20 |
| 128r | 10648 | 7/7/7 | 1 |

PRIOR ART

FIG. 2

135

| | COMBINATION 132 | EXPECTED HITS PER CYCLE 134 | PAY AMOUNT 138 | COINS PAID 140 | FIXED PLAYER WIN/ (LOSS) 142 | PROPOR-TIONAL PAYOUT 144 | PROPORTION-AL PLAYER WIN/(LOSS) 146 |
|---|---|---|---|---|---|---|---|
| 136a | NONWINNING COMBINATION | 8570 | 0 | 0 | (8,570) | 80% | (1714.0) |
| 136b | CHERRY/ANY/ANY | 680 | 2 | 1,360 | 680 | 130% | 204.0 |
| 136c | ANY/ANY/CHERRY | 680 | 2 | 1,360 | 680 | 130% | 204.0 |
| 136d | CHERRY/CHERRY/ANY | 200 | 5 | 1,000 | 800 | 160% | 120.0 |
| 136e | ANY/CHERRY/CHERRY | 200 | 5 | 1,000 | 800 | 160% | 120.0 |
| 136f | CHERRY/ANY/CHERRY | 68 | 5 | 340 | 272 | 160% | 40.8 |
| 136g | CHERRY/CHERRY/CHERRY | 20 | 20 | 400 | 380 | 300% | 40.0 |
| 136h | BAR/ORANGE/ORANGE | 42 | 10 | 420 | 378 | 175% | 31.5 |
| 136i | ORANGE/ORANGE/BAR | 6 | 10 | 60 | 54 | 175% | 4.5 |
| 136j | ORANGE/ORANGE/ORANGE | 42 | 20 | 840 | 798 | 300% | 84.0 |
| 136k | BAR/PLUM/PLUM | 20 | 14 | 280 | 260 | 175% | 15.0 |
| 136l | PLUM/PLUM/BAR | 5 | 14 | 70 | 65 | 175% | 3.75 |
| 136m | PLUM/PLUM/PLUM | 50 | 20 | 1,000 | 950 | 300% | 100.0 |
| 136n | BAR/BELL/BELL | 4 | 18 | 72 | 68 | 200% | 4.0 |
| 136o | BELL/BELL/BAR | 20 | 18 | 360 | 340 | 200% | 20.0 |
| 136p | BELL/BELL/BELL | 20 | 20 | 400 | 380 | 300% | 40.0 |
| 136q | BAR/BAR/BAR | 20 | 50 | 1,000 | 980 | 750% | 130.0 |
| 136r | 7/7/7 | 1 | 100 | 100 | 99 | 1,000% | 9.0 |

FIG. 3

129

| | COMBINATION 132 | EXPECTED HITS PER CYCLE 134 | PROPORTIONAL PAYOUT 144 | PROPORTIONAL PLAYER WIN/(LOSS) 146 | PROPORTIONAL PAYOUT 145 | PROPORTIONAL PLAYER WIN/(LOSS) 147 |
|---|---|---|---|---|---|---|
| 137a | NONWINNING COMBINATION | 8570 | 80% | (1714.0) | 80% | (1714.0) |
| 137b | CHERRY/ANY/ANY | 680 | 130% | 204.0 | 130% | 204.0 |
| 137c | ANY/ANY/CHERRY | 680 | 130% | 204.0 | 130% | 204.0 |
| 137d | CHERRY/CHERRY/ANY | 200 | 160% | 120.0 | 160% | 120.0 |
| 137e | ANY/CHERRY/CHERRY | 200 | 160% | 120.0 | 160% | 120.0 |
| 137f | CHERRY/ANY/CHERRY | 68 | 160% | 40.8 | 160% | 40.8 |
| 137g | CHERRY/CHERRY/CHERRY | 20 | 300% | 40.0 | 300% | 40.0 |
| 137h | BAR/ORANGE/ORANGE | 42 | 175% | 31.5 | 175% | 31.5 |
| 137i | ORANGE/ORANGE/BAR | 6 | 175% | 4.5 | 175% | 4.5 |
| 137j | ORANGE/ORANGE/ORANGE | 42 | 300% | 84.0 | 300% | 84.0 |
| 137k | BAR/PLUM/PLUM | 20 | 175% | 15.0 | 175% | 15.0 |
| 137l | PLUM/PLUM/BAR | 5 | 175% | 3.75 | 175% | 3.75 |
| 137m | PLUM/PLUM/PLUM | 50 | 300% | 100.0 | 300% | 100.0 |
| 137n | BAR/BELL/BELL | 4 | 200% | 4.0 | 200% | 4.0 |
| 137o | BELL/BELL/BAR | 20 | 200% | 20.0 | 200% | 20.0 |
| 137p | BELL/BELL/BELL | 20 | 300% | 40.0 | 300% | 40.0 |
| 137q | BAR/BAR/BAR | 20 | 750% | 130.0 | 1,000% | 180.0 |
| 137r | 7/7/7 | 1 | 1,000% | 9.0 | 1,500% | 14.0 |

FIG. 3A

150

| | COMBINATION 132 | EXPECTED HITS PER CYCLE 134 | PROPOR-TIONAL PAYOUT 154 | PLAYER WIN/(LOSS) 156 |
|---|---|---|---|---|
| 152a | NONWINNING COMBINATION | 8570 | 80% | (1714.0) |
| 152b | CHERRY/ANY/ANY | 680 | 130% | 204.0 |
| 152c | ANY/ANY/CHERRY | 680 | 130% | 204.0 |
| 152d | CHERRY/CHERRY/ANY | 200 | 160% | 120.0 |
| 152e | ANY/CHERRY/CHERRY | 200 | 160% | 120.0 |
| 152f | CHERRY/ANY/CHERRY | 68 | 160% | 40.8 |
| 152g | CHERRY/CHERRY/CHERRY | 20 | 300% | 40.0 |
| 152h | BAR/ORANGE/ORANGE | 42 | 175% | 31.5 |
| 152i | ORANGE/ORANGE/BAR | 6 | 175% | 4.5 |
| 152j | ORANGE/ORANGE/ORANGE | 42 | 300% | 84.0 |
| 152k | BAR/PLUM/PLUM | 20 | 175% | 15.0 |
| 152l | PLUM/PLUM/BAR | 5 | 175% | 3.75 |
| 152m | PLUM/PLUM/PLUM | 50 | 300% | 100.0 |
| 152n | BAR/BELL/BELL | 4 | 200% | 4.0 |
| 152o | BELL/BELL/BAR | 20 | 200% | 20.0 |
| 152p | BELL/BELL/BELL | 20 | 300% | 40.0 |
| 152q | BAR/BAR/BAR | 20 | 750% | 130.0 |
| 152r | 7/7/7 | 1 | 100.00 | 99.0 |

FIG. 4

160

| | COMBINATION 132 | EXPECTED HITS PER CYCLE 134 | PROPORTIONAL PAYOUT 164 | PLAYER WIN/(LOSS) 166 |
|---|---|---|---|---|
| 162a | NONWINNING COMBINATION | 8570 | (0.2) | (1714.0) |
| 162b | CHERRY/ANY/ANY | 680 | 130% | 204.0 |
| 162c | ANY/ANY/CHERRY | 680 | 130% | 204.0 |
| 162d | CHERRY/CHERRY/ANY | 200 | 160% | 120.0 |
| 162e | ANY/CHERRY/CHERRY | 200 | 160% | 120.0 |
| 162f | CHERRY/ANY/CHERRY | 68 | 160% | 40.8 |
| 162g | CHERRY/CHERRY/CHERRY | 20 | 300% | 40.0 |
| 162h | BAR/ORANGE/ORANGE | 42 | 175% | 31.5 |
| 162i | ORANGE/ORANGE/BAR | 6 | 175% | 4.5 |
| 162j | ORANGE/ORANGE/ORANGE | 42 | 300% | 84.0 |
| 162k | BAR/PLUM/PLUM | 20 | 175% | 15.0 |
| 162l | PLUM/PLUM/BAR | 5 | 175% | 3.75 |
| 162m | PLUM/PLUM/PLUM | 50 | 300% | 100.0 |
| 162n | BAR/BELL/BELL | 4 | 200% | 4.0 |
| 162o | BELL/BELL/BAR | 20 | 200% | 20.0 |
| 162p | BELL/BELL/BELL | 20 | 300% | 40.0 |
| 162q | BAR/BAR/BAR | 20 | 750% | 130.0 |
| 162r | 7/7/7 | 1 | 1,000% | 9.0 |

FIG. 5

GAMING METHOD AND APPARATUS HAVING A PROPORTIONAL PAYOUT

This application is a continuation of U.S. patent application Ser. No. 08/947,243 filed Oct. 8, 1997 in the name of Walker et al., and titled "GAMING METHOD AND APPARATUS HAVING A PROPORTIONAL PAYOUT."; which issued as U.S. Pat. No. 6,213,877 on Apr. 10, 2001.

FIELD OF THE INVENTION

The present invention relates to gaming apparatus and more particularly to gaming apparatus such as slot machines having proportional payout capabilities.

BACKGROUND OF THE INVENTION

Slot machines generate greater than ten billion dollars per year in revenue for US casinos, with individual machines typically earning between fifty and one hundred and fifty dollars per day. Despite their popularity, however, slot machines offer players a somewhat limited selection of strategies in comparison to other casino games.

More specifically, table game players, such as blackjack players, have the opportunity to 'press' or increase their bets when they feel lucky, and to reduce their bets when they feel unlucky. No comparable option is readily available to the slot player.

While a slot player may reduce a bet by reducing the number of coins played, this option often results in his being excluded from the opportunity to win the top jackpot. In order to significantly increase his bet, a player typically would have to move to a higher denomination machine, a very undesirable option requiring him to leave his lucky, or 'hot' machine. While a player may have the option to increase the number of coins bet, the range of bets on typical machines is very limited—often from one to three coins.

Thus, it would be very desirable to provide a slot machine which offers to players the ability to press or increase their bets when they are winning. It would be further desirable to offer such a machine which enables players to limit their losses when they are losing. Such a machine could result in the increase of both the total play and the wagered amount of the players.

SUMMARY OF THE INVENTION

An object of the present invention is to provide a gaming apparatus such as a slot machine which provides payouts which are a proportion of the amount wagered.

In accordance with one aspect of the present invention, a gaming method and apparatus having a proportional payout are provided, the apparatus comprising a processor and a memory connected to the processor. The memory stores a series of outcomes, and at least one proportional payout multiplier corresponding to an outcome of the series of outcomes. The processor is operative to select from the series of outcomes a resulting outcome, select a resulting proportional payout multiplier corresponding to the resulting outcome, and determine a game result based on the resulting proportional payout multiplier.

In accordance with another aspect of the invention, a gaming method and apparatus having a proportional payout are provided, the apparatus comprising a processor and a memory connected to the processor. The memory stores a series of outcomes, and a series of proportional payout multipliers each corresponding to an outcome of the series of outcomes. The processor is operative to receive an initiation signal to initiate a game play, receive a wager signal indicating a wager amount for the game play, and receive a random number for the game play. The processor is further operative to select from the series of outcomes a resulting outcome, the resulting outcome based on the random number, to select from the series of proportional payout multipliers a resulting proportional payout multiplier corresponding to the resulting outcome, and apply the resulting proportional payout multiplier to calculate a resulting payout.

DESCRIPTION OF THE DRAWINGS

These and other objects, features and advantages of the invention will be understood from a consideration of the following description of the invention, in which:

FIG. 2 is a table showing components of the probability table of FIG. 1;

FIG. 3 is a table showing components of one embodiment of a proportional payout table;

FIG. 3A is a table showing components of the embodiment of the proportional payout table of FIG. 1;

FIG. 4 is a table showing components of another embodiment of a proportional payout table;

FIG. 5 is a table showing components of yet another embodiment of a proportional payout table;

DETAILED DESCRIPTION OF THE INVENTION

Description of the System

In accordance with the present invention there is provided herein a gaming method and apparatus, illustrated by way of a slot machine, having a proportional payout table used to determine payouts constituting a proportion of the amount wagered.

As used herein, the term "slot machine" means all gaming machines wherein a paid play generates a random or pseudo-random outcome used to determine a payout, including slot machines, video poker, keno, bingo, video roulette, video blackjack, etc.

Figure 1:
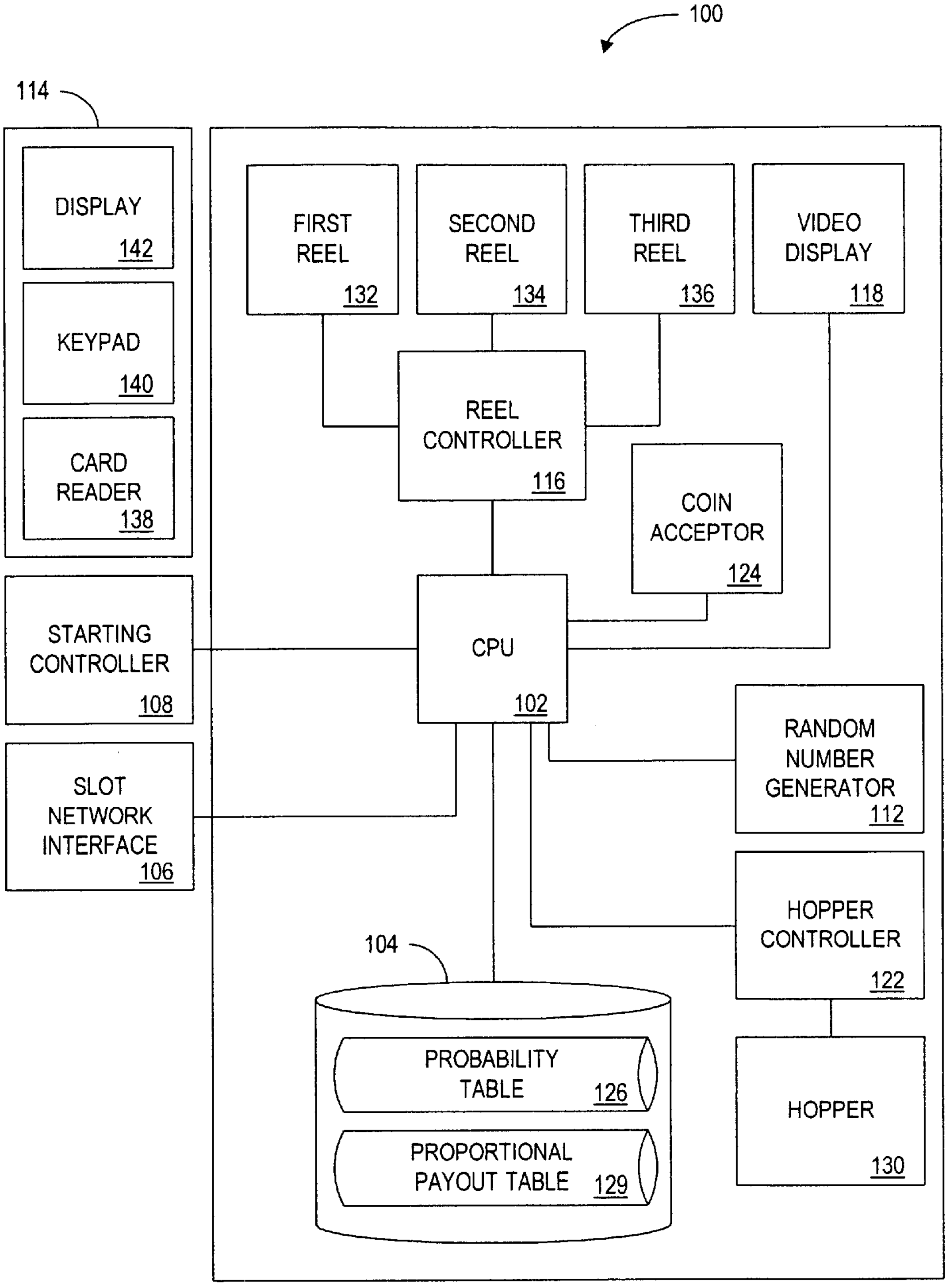
FIG. 1 is a block diagram of a slot machine constructed in accordance with the present invention.

Referring now to FIG. 1, there is shown a block diagram of a slot machine 100 including a central processing unit (CPU) 102 and a data storage device 104 connected to the CPU. Further connected to CPU 102 are: a slot network interface 106, a starting controller 108, a random number generator 112, an input/output (I/O) device 114, a reel controller 116, a video display 118, a hopper controller 122, and a coin acceptor 124.

Slot machine 100 comprises conventional components, with the exception of a proportional payout table 129 contained in storage device 104. As will be described in detail below, proportional payout table 129 functions to determine the payout of the slot machine in accordance with the present invention. For purposes of better illustrating the invention, standard components, well known to those skilled in the art, are described only briefly. Although the present embodiment of the invention is described as implemented with physical components, the invention applies equally well to and includes software embodiments such as would be implemented on the Internet and other computer data networks.

Referring again to CPU 102, the device comprises one of many well known processing units, for example a Pentium class CPU manufactured by Intel Corp. Data storage device 104 comprises an appropriate combination of magnetic and optical memory, such as disk drive memory, and semiconductor memory such as random access memory (RAM) and read only memory (ROM). In addition to proportional payout table 129, data storage device 104 stores a probability table 126 and appropriate operating system and control software (not shown), functional to operate slot machine 100 in the manner described below. Random number generator 112 comprises one of many well known random or pseudo-random number generators suitable for use in a gaming device. As will be further described below, during game play, data storage device 104 also stores a player credit balance. Because generated payouts may be in fractional form in addition to increments of whole coins, storage of a player credit balance includes decimal amounts.

Coin acceptor 124 is operative to receive one or more coins, and to transmit an appropriate value signal to CPU 102. Hopper controller 122, and hopper 130 connected thereto, are operative under the control of CPU 102 to dispense and output coins to a player. In one embodiment, all partial coin amounts are rounded to the nearest whole coin. Reel controller 116 is operative to control the spin and outcome displayed by first, second, and third reels 132, 134, 136, respectively, which may be mechanical in nature, or graphical and displayed on video display 118. In the present embodiment, slot machine 100 comprises a "22 stop" machine, such that 22 indicia are contained on each of reels 132, 134, 136. Video display 118 comprises any appropriate video display apparatus, for example, a cathode ray tube or a liquid crystal display screen.

Starting controller 108 comprises a player-operated device such as a handle or button for initiating the play of a game. I/O device 114 comprises a conventional player interface including a card reader 138 for receiving a player tracking card, a display 142 for communicating alpha/numeric messages to the player, and a keypad 140 for receiving player input such as a player identifier.

Slot network interface 106 comprises a conventional network interface for connecting slot machine 100 to a centrally controlled network consisting of multiple machines, enabling functions further described below.

Referring now to FIG. 2, probability table 126 is seen to include eighteen records indicated at 128*a–r*, each record including three fields: a random number field 130, a combination field 132, and an expected hits per cycle field ('hits' field)134. Random number field 130 of each record indicates a range of random numbers, for example record 128*d* indicating a range of random numbers from 9931 through 10130. Combination field 132 indicates a reel indicia combination for each random number range, the combination for record 128*d* comprising "Cherry/Cherry/Any", the "Any" constituting any reel indicia other than Cherry. Thus, when random number generator 112 generates a random number in the range of 9931 through 10130 for a game play (the details of which are described below), reel controller 116 will control reels 132, 134, 136 to display the described Cherry/Cherry/Any combination.

Continuing with reference to FIG. 2, hits field 134 includes the theoretical number of times a particular random number range and corresponding combination will occur, out of a total of 10,648 plays in a cycle. Thus, with reference again to record 128*d*, a random number in the range of 9931 through 10130 will occur, resulting in a Cherry/Cherry/Any combination, two hundred times out of every 10,468 game plays. Each other record 128*a–r* in table 126 is interpreted in a like manner.

The selection of the data for probability table 126 is performed in a manner well known to those skilled in the art, and, as will be understood from a consideration of the further explanation below, is performed so as to yield combinations 132 and payouts that make the game enticing to the player while yielding a 'house advantage' sufficient to produce a predetermined level of profit for the operator of the slot machine. The contents of table 126 have been selected for the described embodiment of the invention from Regan, Jim, *Winning At Slot Machines,* Carol Publishing Group Edition, 1996. One skilled in the art will recognize the table as conventional for a twenty-two stop machine.

Referring now to FIG. 3, one embodiment of a proportional payout table 135 is shown to include eighteen records 136*a–r*, each of which includes seven fields: combination and expected hits per cycle fields 132, 134, which are identical to the like-numbered fields from FIG. 2, a pay amount field 138, a coins paid field 140, a fixed player win/(loss) field 142, a proportional payout field 144, and a proportional player win/(loss) field 146.

Pay Amount field 138, coins paid field 140, and fixed player win/(loss) field 142 comprise fields from a conventional prior art slot machine. They are included here for the purpose of illustrating the invention. They are not necessary to the practice of the present invention.

More particularly, pay amount field 138 indicates the number of coins paid out on a game play where a random number results in the generation of a particular combination 132. Coins paid 140 indicates the theoretical number of coins paid out over the cycle of 10,468 plays for each combination 132, while fixed player win/(loss) field 142 indicates the theoretical player win/(loss) for a given pay combination 132. Thus, examining record 136*d*, with the Cherry/Cherry/Any combination expected to occur 200 times out of a cycle of 10,468 plays, and with a pay amount of 5 coins, then 1000 coins would be paid out over the cycle. Subtracting the 200 coins wagered yields the player win of 800 coins. A slot machine paying out in accordance with pay amount field 138 would provide a house advantage of 5.5%, calculable by dividing the total player loss of 586 coins by the total coins wagered for the cycle of 10,468. Continuing to describe FIG. 3, in lieu of using pay amount field 138 to determine a payout for a given combination, in accordance with the present invention, proportional payout field 144 is used to determine a proportional percentage of the wagered amount to be paid for each given combination. Thus, continuing to examine record 136*d*, for the Cherry/Cherry/Any combination, a proportional payout of one-hundred and sixty percent (160%) of the wagered amount will be paid out to the player. For example, a player putting at risk a wager of thirty coins would receive a payout of eighteen coins, bringing his credit balance to forty-eight coins. For the non-winning combination of record 136*a*, eighty percent out of the player's credit balance will remain, resulting in a 20% loss of the amount wagered by the player.

Examining proportional player win/(loss) field 146 (which is based on a one coin wager), it can be seen that the total payouts to the players and the total house advantage using applicant's proportional payout table remain almost the same as those resulting from the use of the fixed pay amount. Thus, as will be described in further detail below, applicant's slot machine provides players with significantly improved wagering flexibility and options while providing substantially the same player payout and house advantage.

With reference now to FIG. 3A, proportional payout table 129 is shown to include eighteen records 137*a–r*, each including six fields: combination and expected hits per cycle fields 132, 134, corresponding to the like-numbered fields in FIG. 3, proportional payout and proportional player win/(loss) fields 144, 146, also corresponding to the like-numbered fields in FIG. 3, a second proportional payout field 145, and a second player win/(loss) field 147. In comparison to proportional payout table 135 of FIG. 3, proportional payout field 145 has been included to provide increased payouts for wagers greater than a predetermined number of coins/credits: in the embodiment described here, wagers greater than one hundred coins. Proportional player win/(loss) field 147 provides corresponding data for proportional payout field 145.

Thus for wagers of less than one hundred coins, proportional payout field 144 is used to select the appropriate proportional payout. For wagers greater than one hundred coins, a proportional payout is selected from proportional payout field 145. As will be understood from a consideration of proportional player win/(loss) field 147, the house advantage is lower for larger wagers having a proportional payout selected from field 145. Such a lower house advantage is similar to the lower house advantage accepted for slot machines of the prior art: that is, for example, machines of the prior art typically incorporate bonus payouts when maximum coins are played.

Turning now to FIG. 4, another proportional payout table 150 is shown including eighteen records 152*a–r*, each including four fields: combination and expected hits per cycle fields 132, 134, corresponding to the like-numbered fields in FIG. 3, a proportional payout field 154, and a player win/(loss) field 156. In comparison to proportional payout table 135 of FIG. 3, proportional payout field 154 has been modified in record 152*r* to reflect a maximum payout, or jackpot, of a fixed number of 100 coins. The net player profit and house advantage remain substantially the same as when the previous embodiment of the proportional payout table is utilized, thus providing players with a fixed jackpot game option. Higher jackpot payouts can be offered where a lower house advantage is acceptable. In an alternate embodiment of the invention, the higher of either the jackpot or the proportional payout is paid to the player.

It should be noted that in embodiments in which fixed payouts are combined with proportional payouts, the house advantage varies depending on the number of coins wagered. In the present embodiment, as more coins are wagered, the house advantage increases because one of the potential payouts to the player (the jackpot for 7-7-7) remains fixed, i.e. does not increase along with the other payouts. Players may perceive a benefit in that the top payout is guaranteed to be a substantial fixed value, regardless of the number of coins wagered.

With reference now to FIG. 5, yet another proportional payout table 160 is shown including eighteen records 162*a–r*, each including four fields: combination and expected hits per cycle fields 132, 134, corresponding to the like-numbered fields in FIG. 4, a proportional payout field 164, and a player win/(loss) field 166. In comparison to proportional payout table 135 of FIG. 3, proportional payout field 164 has been modified in record 162*a* to reflect a fixed loss for each losing play. In the embodiment shown, a player will lose 0.2 coins every losing play, resulting in the loss of one (1) full coin for every five losing plays.

In alternate embodiments, the value of the fixed coin loss can be adjusted, and is preferably variable depending on the size of the wager. While a fraction of a coin may be an appropriate loss for wagers of up to several coins, a larger loss is appropriate for larger wagers. For example, an adjustable scale may provide a 20 coin loss for wagers in the 100–200 coin range, and a 30 coin loss for wagers in the 200–300 coin range. As with the alternate embodiment described with respect to FIG. 4 above, the remaining proportional payouts can be adjusted such that the net player loss and house advantage remain substantially the same as that of FIG. 3, thus providing players with a fixed loss game option.

Figure 6:
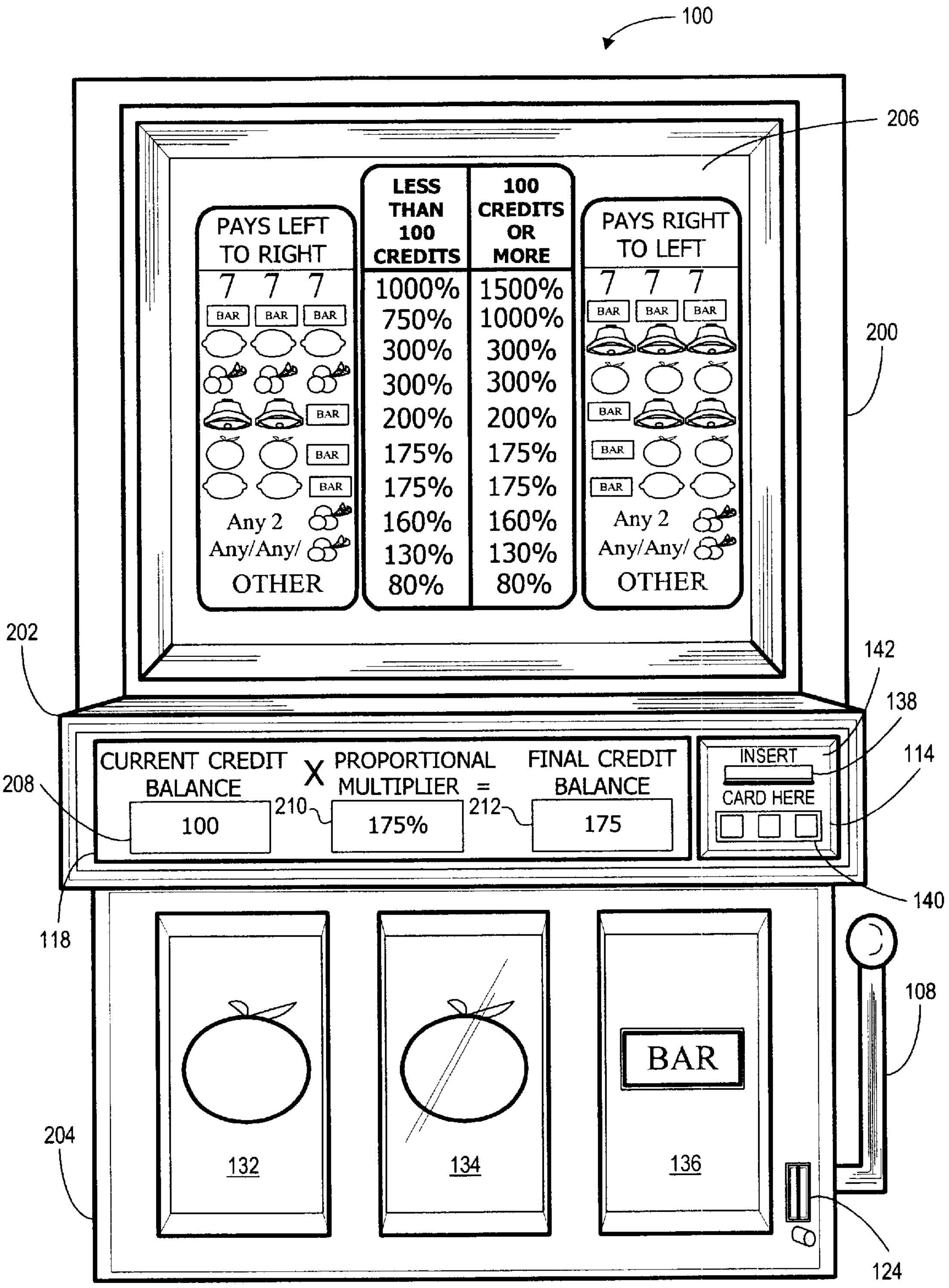
FIG. 6 is a plan view of a slot machine constructed in accordance with the present invention.

Referring now to FIG. 6, a plan view of slot machine 100 is shown which, for purposes of discussion, is generally divided into three sections: an upper panel 200, a central panel 202, and a lower panel 204. Upper panel 200 includes a pay table 206 comprising, for example, painted 'belly' glass. The details of pay table 206 are discussed with respect to FIG. 7.

Central panel 202 houses I/O device 114 including card reader 138, keypad 140, and display 142 shown set to read "INSERT CARD HERE." To the left of I/O device 114 is positioned video display area 118, the display shown as reading a CURRENT CREDIT BALANCE value 208, a PROPORTIONAL MULTIPLIER value 210, and a FINAL CREDIT BALANCE value 212, the details and operation of which are described below.

Lower panel 204 is seen to house coin acceptor 124, starting controller 108 (in the form of a handle), and the display of first reel 132, second-reel 134, and third reel 136. In the described embodiment, the three reels constitute mechanical reels having painted indicia visible through lower panel 204. In an alternate embodiment, the reels constitute virtual electronic functions with outputs shown on conventional electronic graphical displays, such as LCD displays.

Figure 7:
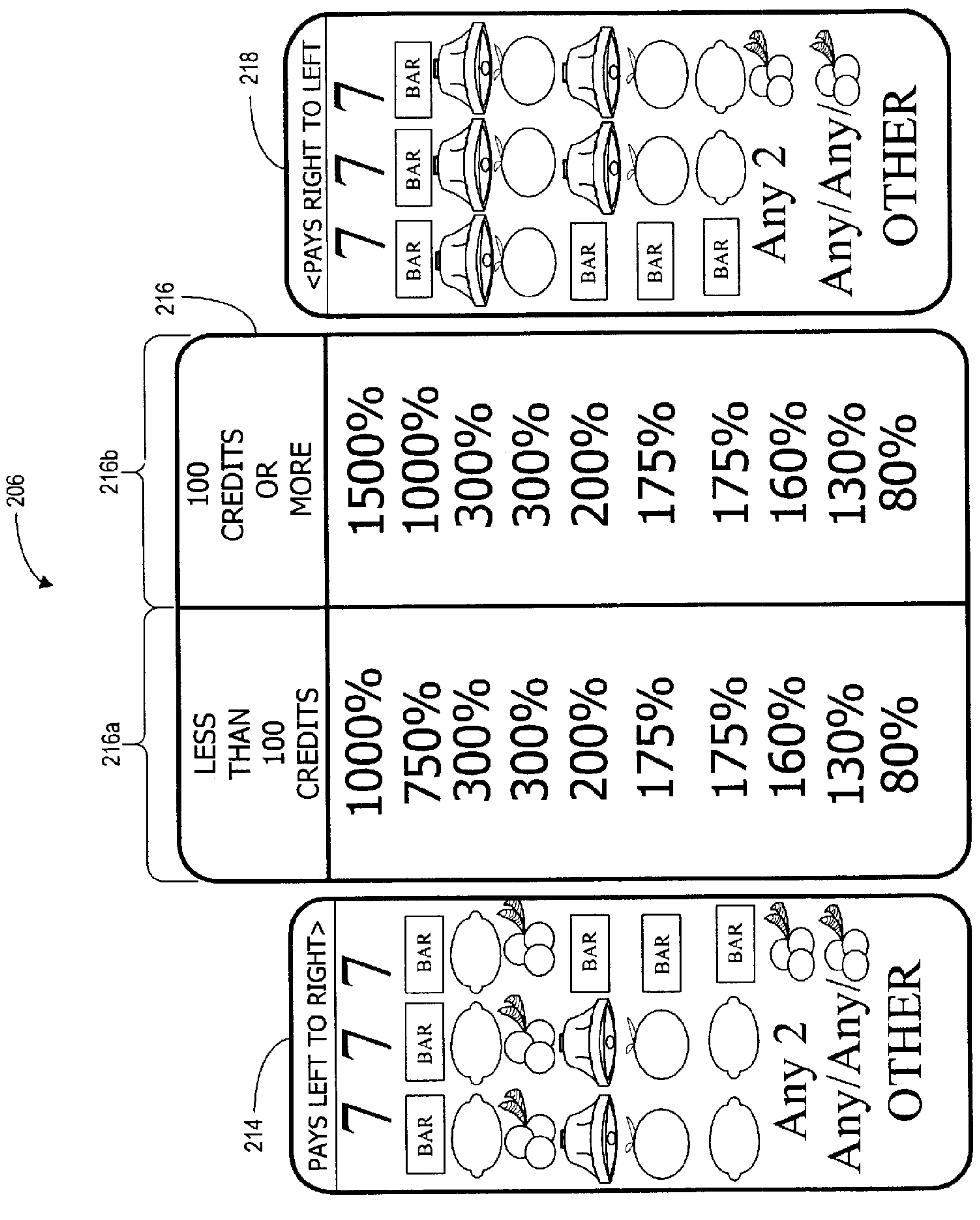
FIG. 7 is an enlarged view of the payout table of FIG. 6.

With reference now to FIGS. 6 and 7, pay table 206 is seen to include three distinct graphical areas: a first combination table 214, a proportional multiplier table 216, and a second combination table 218. Each combination table represents, in descending order of value, possible outcomes described in combination field 132 of proportional pay table 129. Multiplier table 216 represents the data stored in the proportional payout fields 144 and 145 of proportional payout table 129. That is, the proportional payouts in table 216*a* correspond to field 144 of proportional payout table 129 and are available to players wagering less than 100 coins (or credits) on a given play. The higher set 216*b* of proportional payouts correspond to field 145 of proportional payout table 129 and define awards for players wagering more than 100 coins on a game play. As is well known to those skilled in the art, the results of a game play, indicated by the displayed indicia on first, second, and third reels 132, 134, 136, are used with the indicia in pay tables 214 and 218 to determine the outcome, or proportional payout from table 216, of a play. The outcome is determined as a result of the random number generated upon initiation of game play.

The inclusion of two sets 216*a* and 216*b* of proportional payouts are intended to motivate players to place larger wagers on game plays. As described above, these two tables 216*a*, 216*b* correspond respectively to the two payout fields 144, 145 of proportional payout table 129 (FIG. 3A). A player depositing 200 coins, for example, is eligible to receive a proportional payout of 1500% for a 7/7/7 outcome, an award which is larger than the 1000% proportional payout available to a player wagering fewer than 100 coins.

It will be appreciated that this two-tiered bonus structure is similar to that of bonuses awarded for royal flushes in video poker where maximum coins are wagered.

Figure 8:
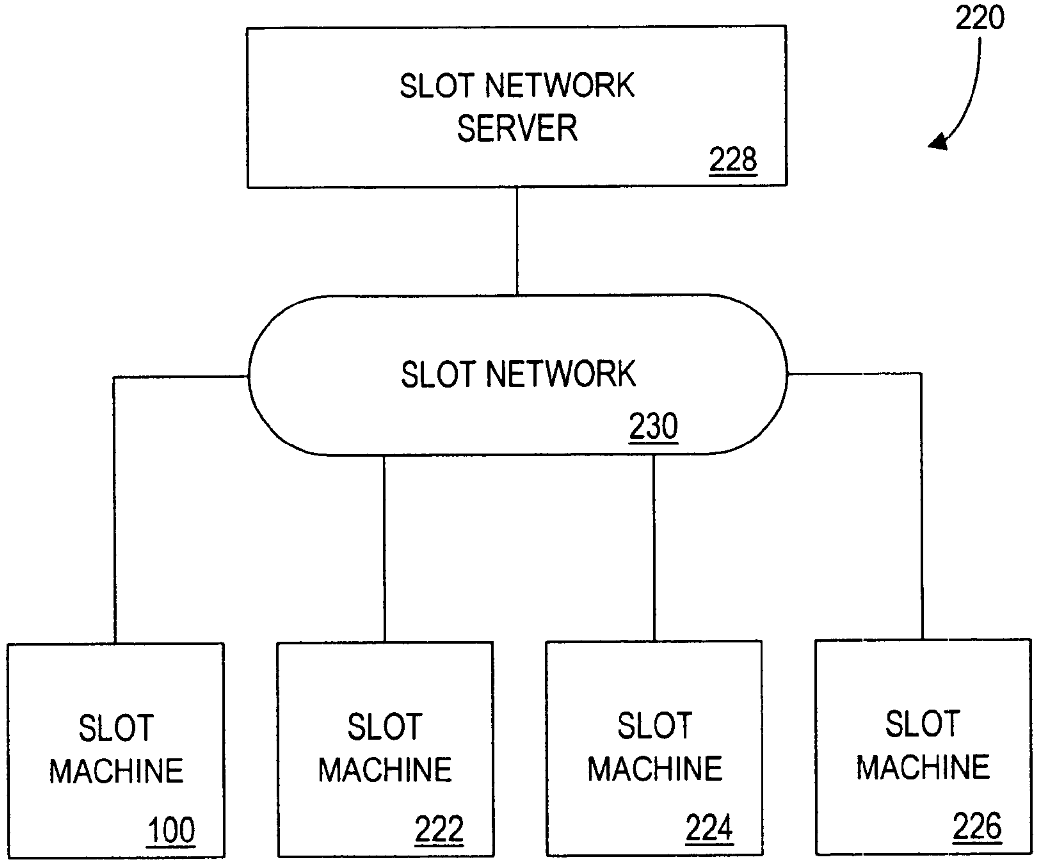
FIG. 8 is a block diagram of a network of slot machines in accordance with an embodiment of the invention.

Referring now to FIG. 8, a slot machine network 220 is shown to include four slot machines 100, 222, 224, 226 connected to a slot network server 228 through a slot network interface 230. Slot machines 222, 224, 226 may be identical to slot machine 100, or may comprise completely different machine types, many of which are well known in the art.

Slot network server 228 can comprise one of many known servers, for example an RS/6000 manufactured by IBM Corp. Slot network interface 230 likewise comprises a well known combination of computer data links and network interface equipment. In operation, the network of slot machines enables player information to be stored on slot network server 228 and accessed at each slot machine upon the use of a player tracking or identification card in reader 138. Such central storage of information enables, for example, the storage of player credits, the storage of player-specific information, game results such as handle pulls or coin-in, and the monitoring, control and adjustment of the various connected slot machines. Networking of slot machines has particular application in the present invention in that it enables player credit balances to be stored on and retrieved from slot network server 228. This enables a player to easily identify a large credit balance with which to wager, taking full advantage of the proportional payout feature of the machine.

Description of the Operation

Figure 9:
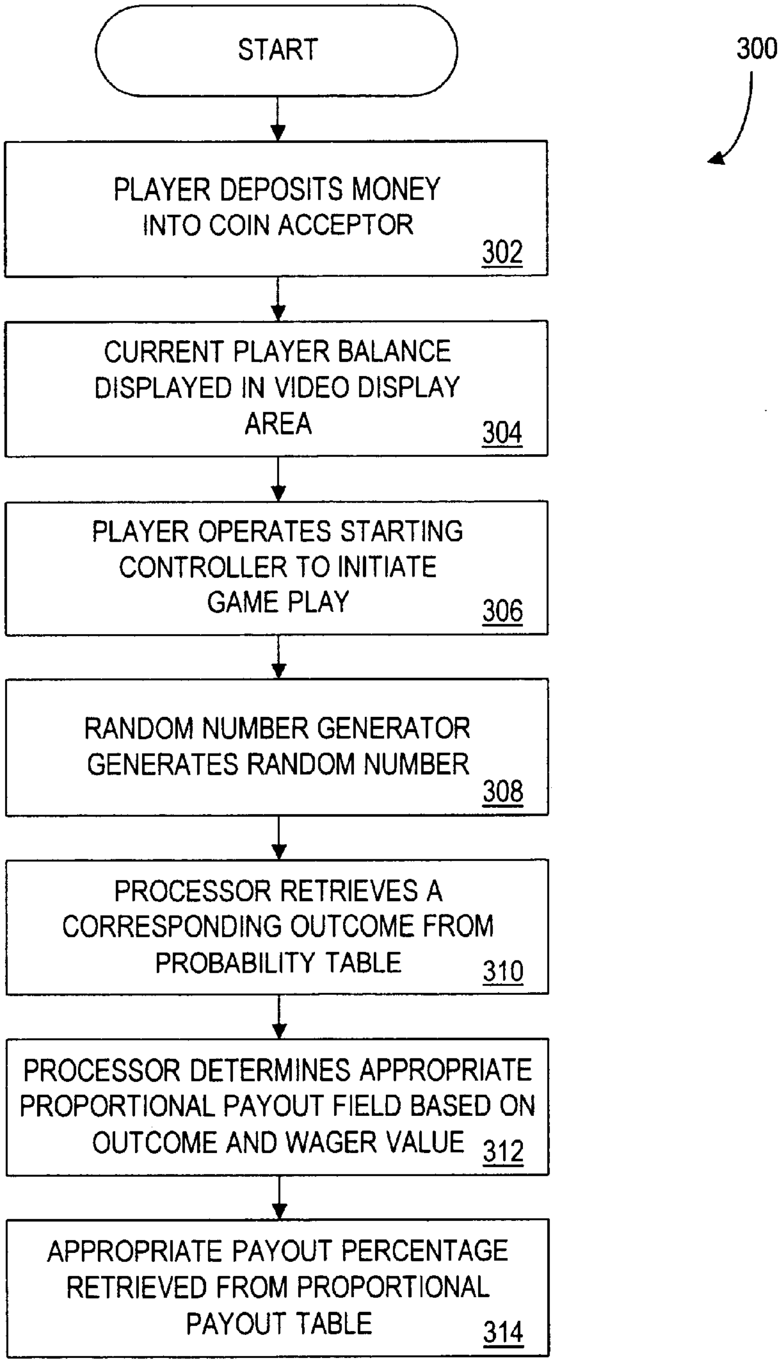
FIGS. 9 & 10 together comprise a flowchart illustrating a method of operating a slot machine in accordance with the present embodiment.

Referring now to FIG. 9, a method 300 is shown for operating slot machine 100 in accordance with proportional payout table 129 of FIG. 3A. The operation of the machine using alternate payout tables 135 (FIG. 3), 150 (FIG. 4), or 160 (FIG. 5) is substantially identical with the substitution of the alternate proportional payouts.

To enable a game play, a player must first establish a credit balance with the slot machine. This can be accomplished by inserting coins into coin acceptor 124 (step 302). Alternatively, the credit balance can be established by using a player tracking/identification card that either: 1) includes a credit balance encoded thereon, or 2) references a credit balance stored in slot network server 228 through slot machine network 220. In all cases, the available player balance is displayed on video display 118 (step 304).

To initiate a game play, a player operates the starting controller of slot machine 100, in this case by pulling handle 108 (step 306). Responsive to the starting of the game, a random number is obtained from generator 112 (step 308). It will be understood that this random number can be generated specifically for the game, or may be selected from a series of random numbers being generated on a consistent or periodic basis by random number generator 112. Many methods of generating random numbers are well known in the art.

Subsequent to the generation of a random number for the game play, that random number is used with probability table 126 to identify the record and hence the combination corresponding to the range of the random number (step 310). For example, the random number 9998 would fall in the range designated by record 128*d*, identifying the combination Cherry/Cherry/Any. The combination along with the wager value is then used to identify the corresponding field in proportional payout table 129, in this example field 144 or 145 from record 137*d* (step 312). Hence if the wager was less than one hundred coins, then the proportional payout is selected from field 144 to be 160%, while if the wager was greater than one hundred coins the proportional payout is selected from field 145. While an identical payout results for the present example, it will be seen that different payouts would result for the winning combinations of records 137*q* and 137*r*.

CPU 102 uses the retrieved payout percentage (step 314) with the wager value signal (step 316) to calculate a new credit balance (step 318). So, for example, assuming that the credit balance showed a wager value of 90 coins, and the game play resulted in a combination of Cherry/Cherry/Any, then from record 137*d* the proportional payout of 160% is used to calculate the new credit balance as follows. Equation 1) shows the generic calculation, while equation 2) shows the actual calculation for the described example:

1) starting credit balance×proportional payout=new credit balance, 2) 90 coins×1.6=144 coins.

Figure 10:
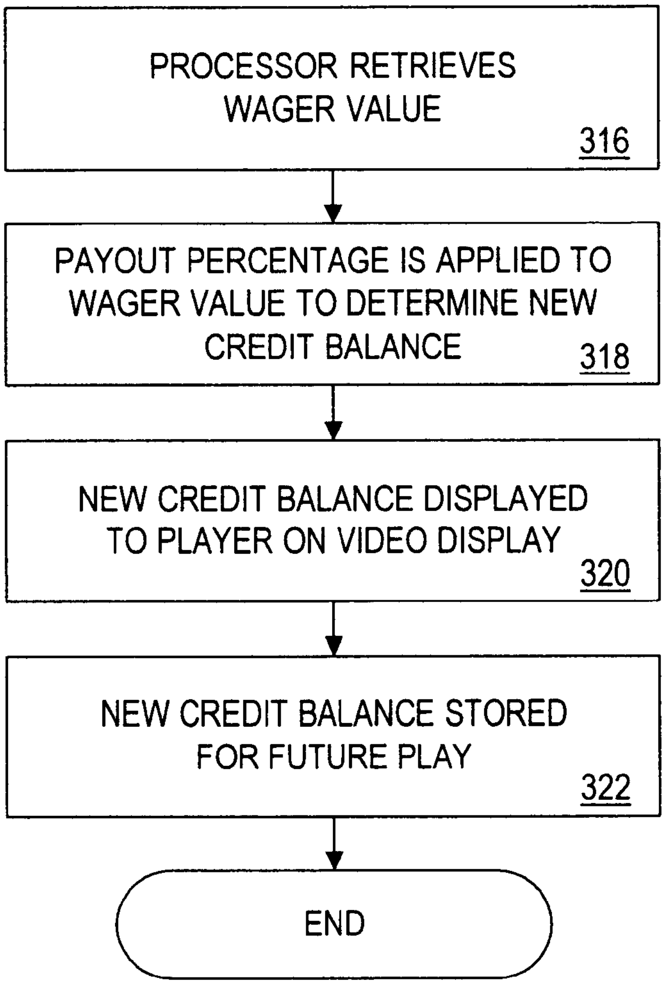

Continuing with reference to FIG. 10, the new credit balance is displayed to the player on video display 118 (step 320), and stored for future play (step 322).

Alternate Embodiments of the Invention

Alternate proportional payout tables 135, 150, and 160 may be used in lieu of table 129, with the latter two providing a maximum jackpot, and a fixed value loss, respectively. The operation of the machine would otherwise be identical to that described above.

While several different proportional payout tables have been shown and described above, those skilled in the art will recognize that numerous different proportional payout schemes may be implemented in accordance with the present invention.

In another embodiment of the invention, the maximum jackpot for machine 100 may be progressive. That is, the jackpot increases in value for each play that a jackpot payout is not awarded. Such progressive jackpots could be applied to proportional payouts by increasing the proportion, and to fixed payouts by increasing the fixed jackpot amount.

As mentioned briefly above, slot machine 100 can be altered to provide a player with the ability to vary his bet by selecting for each play some to all of his available credit for wagering. Such a function would be provided by enabling CPU 102 to receive a signal indicating the value of the wager, for example from keypad 140 of I/O device 114, or from a separate, dedicated input device (not shown). In this embodiment, the proportional payout multiplier is applied to the wager amount, which may vary from the credit balance.

In yet another embodiment, a minimum wager may be required in order to make a player eligible for a jackpot payout. Such a minimum wager would be displayed directly on the face of slot machine 100.

SUMMARY

There is thus provided a new and improved gaming machine wherein a proportional payout based on a wager value is provided in lieu of a fixed payout amount. The invention enables players to wager large numbers of coins (i.e. to place large bets) on machines typically limited to several coins, thereby permitting the players to increase their bets when they feel lucky. The invention provides many different payout options, including ones where losses are proportionally limited to the wager amount. While the invention has been shown and described with respect to a slot machine, it is not so limited. It has applicability to all of the types of gaming machines described above, and has particular applicability to casino type gambling machines.

What is claimed is:

1. A gaming apparatus providing a proportional payout, comprising:

a processor;

a memory connected to said processor;

said memory storing a series of outcomes, and at least one proportional payout multiplier corresponding to at least one outcome of said series of outcomes;

said processor operative to determine a first credit balance being wagered on a game play;

select, from said series of outcomes, a resulting outcome;

select a resulting proportional payout multiplier corresponding to said resulting outcome, wherein said resulting proportional payout multiplier is other than an amount wagered on said game play; and determine a second credit balance by multiplying said resulting proportional payout multiplier by said first credit balance, wherein the resulting proportional payout multiplier is greater than zero if the resulting outcome comprises a non-winning combination of indicia.

2. A gaming apparatus in accordance with claim 1, said processor further operative to:

receive a random number; and select said resulting outcome based on said random number.

3. A gaming apparatus in accordance with claim 1, wherein said at least one proportional payout multiplier comprises a series of proportional payout multipliers, each corresponding to at least one outcome of said series of outcomes.

4. The apparatus of claim 1, wherein the at least one proportional payout multiplier comprises one of a fraction, a decimal, and a percentage.

5. The apparatus of claim 1, wherein at least one of the first credit balance and the second credit balance is a fractional amount.

6. The apparatus of claim 1 wherein the processor is further operative to:

receive a signal indicating a request to cash out the second credit balance;

determine whether the second credit balance comprises a fractional amount of units on which the second credit balance is based;

round the second credit balance to a whole amount of units if the second credit balance corresponds to a fractional amount; and dispense the whole amount of units.

7. A method of operating a gaming apparatus to provide a proportional payout, comprising the steps of:

providing a series of outcomes, and at least one proportional payout multiplier corresponding to at least one outcome of said series of outcomes;

determining a first credit balance being wagered on a game play;

selecting, from said series of outcomes, a resulting outcome;

selecting a resulting proportional payout multiplier corresponding to said resulting outcome, wherein said resulting proportional payout multiplier is other than an amount wagered on said game play; and determining a second credit balance by multiplying said resulting proportional payout multiplier by said first credit balance, wherein the resulting proportional payout multiplier is greater than zero if the resulting outcome comprises a non-winning combination of indicia.

8. A method in accordance with claim 7, wherein said step of determining a second credit balance includes determining a payout by multiplying said resulting proportional payout multiplier by said first credit balance.

9. A method in accordance with claim 7, and further including the steps of:

receiving a random number; and selecting said resulting outcome based on said random number.

10. A method in accordance with claim 7, wherein said at least one proportional payout multiplier comprises a series of proportional payout multipliers, each corresponding to at least one outcome of said series of outcomes.

11. A gaming apparatus providing a proportional payout, comprising:

means for providing a series of outcomes, and at least one proportional payout multiplier corresponding to at least one outcome of said series of outcomes;

means for determining a first credit balance being wagered on a game play;

means for selecting, from said series of outcomes, a resulting outcome;

means for selecting a resulting proportional payout multiplier corresponding to said resulting outcome, wherein said resulting proportional payout multiplier is other than an amount wagered on said game play; and means for determining a second credit balance by multiplying said resulting proportional payout multiplier by said first credit balance, wherein the resulting proportional payout multiplier is greater than zero if the resulting outcome comprises a non-winning combination of indicia.

12. A medium encoded with a program for implementing a method, said program for directing a device to perform the steps of:

providing a series of outcomes, and at least one proportional payout multiplier corresponding to at least one outcome of said series of outcomes;

determining a first credit balance being wagered on a game play;

selecting, from said series of outcomes, a resulting outcome;

selecting a resulting proportional payout multiplier corresponding to said resulting outcome, wherein said resulting proportional payout multiplier is other than an amount wagered on said game play; and determining a second credit balance by multiplying said resulting proportional payout multiplier and said first credit balance, wherein the resulting proportional payout multiplier is greater than zero if the resulting outcome comprises a non-winning combination of indicia.

13. A gaming apparatus providing a proportional payout, comprising:

a processor;

a memory connected to said processor;

said memory storing a series of outcomes, and a series of proportional payout multipliers, each corresponding to at least one outcome of said series of outcomes;

said processor operative to receive an initiation signal to initiate game play, receive a wager signal indicating a first credit balance that constitutes a wager amount for said game play, receive a random number for said game play, select from said series of outcomes a resulting outcome, said resulting outcome based on said random number, select from said series of proportional payout multipliers a resulting proportional payout multiplier corresponding to said resulting outcome, wherein said resulting proportional payout multiplier is other than said wager amount, and apply said resulting proportional payout multiplier to said first credit balance, thus calculating a second credit balance, wherein the resulting proportional payout multiplier is greater than zero if the resulting outcome comprises a non-winning combination of indicia.

14. A gaming apparatus in accordance with claim 13, wherein said second credit balance comprises a function of said resulting proportional payout multiplier and said wager amount.

15. A gaming apparatus in accordance with claim 14, wherein said function comprises a product of said wager amount and said proportional payout multiplier.

16. A gaming apparatus in accordance with claim 13, wherein said series of proportional payout multipliers extend over a range of from less than 1 for a losing result to greater than 1 for a winning payout.

17. A gaming apparatus in accordance with claim 13, wherein:

said series of outcomes further corresponds to a second series of proportional payout multipliers; and said processor is further operative to receive a parameter relating to said game play and to select between said first and second series of proportional payout multipliers based on said parameter.

18. A gaming apparatus in accordance with claim 17, wherein said parameter includes a value which is determined based on said wager amount.

19. A gaming apparatus in accordance with claim 13, wherein said gaming apparatus comprises a slot machine further comprising a plurality of reels.

20. A gaming apparatus in accordance with claim 13, wherein said gaming apparatus comprises a video poker machine further comprising an output device for outputting card values.

21. A gaming apparatus in accordance with claim 13, wherein at least one of said series of outcomes further includes at least one fixed payout corresponding thereto.

22. A gaming apparatus in accordance with claim 21, wherein said one fixed payout includes a jackpot payout.

23. A gaming apparatus in accordance with claim 13, wherein said memory further stores a maximum payout amount, said processor further operative to use said maximum payout amount to limit a payout which is a winning payout.

24. A gaming apparatus in accordance with claim 13, said processor further operative to receive a signal designating a value that is less than said first credit balance as said wager amount.

25. A gaming apparatus in accordance with claim 13, wherein said series of outcomes includes a maximum payout outcome, and wherein the proportional payout multiplier corresponding to said maximum payout outcome is progressive.

26. A gaming apparatus in accordance with claim 25, wherein said memory further stores a minimum jackpot credit balance, said maximum payout outcome available only if said wager amount exceeds said minimum jackpot credit balance.

27. A gaming apparatus in accordance with claim 13, and further including:

a network controller; and said gaming machine connected to said network controller.

28. A method for operating a gaming apparatus to provide a proportional payout, comprising the steps of:

providing a series of outcomes, and a series of proportional payout multipliers, each corresponding to at least one outcome of said series of outcomes;

receiving an initiation signal to initiate a game play;

receiving a wager signal indicating a first credit balance that comprises a wager amount for said game play;

receiving a random number for said game play;

selecting from said series of outcomes a resulting outcome, said resulting outcome based on said random number;

selecting from said series of proportional payout multipliers a resulting proportional payout multiplier corresponding to said resulting outcome, wherein said resulting proportional payout multiplier is other than the wager amount; and applying said resulting proportional payout multiplier to the first credit balance in order to calculate a second credit balance, wherein the resulting proportional payout multiplier is greater than zero if the resulting outcome comprises a non-winning combination of indicia.

29. A method in accordance with claim 28, said second credit balance comprises a function of said resulting proportional payout multiplier and said wager amount.

30. A method in accordance with claim 29, wherein said function comprises a product of said wager amount and said proportional payout multiplier.

31. A method in accordance with claim 28, wherein said series of proportional payout multipliers extend over a range of from less than 1 for a losing payout to greater than 1 for a winning payout.

32. A method in accordance with claim 28, wherein:

said series of outcomes further corresponds to a second series of proportional payout multipliers; and further comprising the steps of:

receiving a parameter relating to said game play; and selecting between said first and second series of proportional payout multipliers based on said parameter.

33. A method in accordance with claim 32, wherein said parameter includes a value which is based on said wager amount.

34. A method in accordance with claim 28, wherein said gaming apparatus comprises a slot machine further comprising a plurality of reels.

35. A method in accordance with claim 28, wherein said gaming apparatus comprises a video poker machine further comprising an output device for outputting card values.

36. A method in accordance with claim 28, at least one of said series of outcomes further includes at least one fixed payout corresponding thereto.

37. A method in accordance with claim 36, wherein said at least one fixed payout includes a jackpot payout.

38. A method in accordance with claim 28, wherein said memory further stores a maximum payout amount of a winning payout.

39. A method in accordance with claim 28, and further including the step of designating a value of less than said first credit balance for said wager amount.

40. A method in accordance with claim 28, wherein said series of outcomes includes a maximum payout outcome, and wherein the proportional payout multiplier corresponding to said maximum payout outcome is progressive.

41. A method in accordance with claim 40, and further including the step of storing a minimum jackpot credit balance, said maximum payout outcome available only if said wager amount exceeds said minimum jackpot credit balance.

42. A gaming apparatus providing a proportional payout, comprising:

means for providing a series of outcomes, and a series of proportional payout multipliers each corresponding to at least one outcome of said series of outcomes;

means for receiving an initiation signal to initiate a game play;

means for receiving a wager signal indicating a first credit balance comprising a wager amount for said game play;

means for receiving a random number for said game play;

means for selecting from said series of outcomes a resulting outcome, said resulting outcome based on said random number;

means for selecting from said series of proportional payout multipliers a resulting proportional payout multiplier corresponding to said resulting outcome, wherein said resulting proportional payout multiplier is other than wager amount; and means for applying said resulting proportional payout multiplier to said wager amount to calculate a second credit balance, wherein the resulting proportional payout multiplier is greater than zero if the resulting outcome comprises a non-winning combination of indicia.

43. A medium encoded with a program for implementing a method, said program for directing a device to perform the steps of:

providing a series of outcomes, and a series of proportional payout multipliers, each corresponding to at least one outcome of said series of outcomes;

receiving an initiation signal to initiate a game play;

receiving a wager signal indicating a first credit balance comprising a wager amount for said game play;

receiving a random number for said game play;

selecting from said series of proportional payout multipliers a resulting proportional payout multiplier corresponding to said resulting outcome, wherein said resulting proportional payout multiplier is other than said wager amount; and applying said resulting proportional payout multiplier to said wager amount to calculate a second credit balance, wherein the resulting proportional payout multiplier is greater than zero if the resulting outcome comprises a non-winning combination of indicia.

44. A medium encoded with a program for implementing a method, said program for directing a device to perform the steps of determining a series of outcomes, said series of outcomes including at least one winning outcome and at least one losing outcome, and determining a series of proportional payout multipliers, each corresponding to an outcome of said series of outcomes;

determining a wagered amount;

selecting, from said series of outcomes, a resulting outcome, selecting from said series of proportional payout multipliers a resulting proportional payout multiplier corresponding to said resulting outcome, and determining a payout amount based on said resulting proportional payout multiplier and said wagered amount, said payout amount being greater than said wagered amount if said resulting outcome is one of said at least one winning outcome, and said payout amount being less than said wagered amount but greater than zero if said resulting outcome is one of said at least one losing outcome.

45. A medium encoded with a program for implementing a method, said program for directing a device to perform the steps of:

(a) determining a series of outcomes, said series of outcomes including at least one winning outcome and at least one losing outcome;

(b) determining a series of proportional payout multipliers, each corresponding to an outcome of said series of outcomes;

(c) determining a wagered amount;

(d) receiving an initiation signal to initiate game play;

(e) receiving a random number for said game play;

(f) selecting, from said series of outcomes, a resulting outcome, said resulting outcome based on said random number;

(g) selecting from said series of proportional payout multipliers a resulting proportional payout multiplier corresponding to said resulting outcome;

(h) determining a payout amount based on said resulting proportional payout multiplier and said wagered amount, said payout amount being greater than said wagered amount if said resulting outcome is one of said at least one winning outcome, and said payout amount being less than said wagered amount but greater than zero if said resulting outcome is one of said at least one losing outcome;

(i) updating said wagered amount based on said payout amount; and (j) repeating steps (d) through (i).

46. A medium encoded with a program for implementing a method, said program for directing a device to perform the steps of:

determining a series of outcomes including at least one winning outcome and at least one losing outcome;

determining a series of proportional payout multipliers, each corresponding to an outcome of said series of outcomes;

determining a starting credit balance;

receiving an input signal;

determining a wager amount based on said starting credit balance and said received input signal, said wager amount being in a range between some to all of said starting credit balance as selected by said input signal;

selecting, from said series of outcomes, a resulting outcome;

selecting from said series of proportional payout multipliers a resulting proportional payout multiplier corresponding to said resulting outcome; and determining a new credit balance based on said resulting proportional payout multiplier, said starting credit balance and said wager amount, said new credit balance being greater than said starting credit balance if said resulting outcome is one of said at least one winning outcome, and said new credit balance being less than said starting credit balance but greater than said starting credit balance less said wager amount if said resulting outcome is one of said at least one losing outcome.

47. A medium encoded with a program for implementing a method; said program for directing a device to perform the steps of:

(a) providing a series of outcomes, said series of outcomes including at least one winning outcome and at least one losing outcome;

(b) providing a series of proportional payout multipliers, each corresponding to an outcome of said series of outcomes;

(c) determining a wagered amount;

(d) receiving an initiation signal to initiate game play;

(e) receiving a random number for said game play;

(f) selecting, from said series of outcomes, a resulting outcome, said resulting outcome based on said random number;

(g) selecting from said series of proportional payout multipliers a resulting proportional payout multiplier corresponding to said resulting outcome;

(h) determining a payout amount based on said resulting proportional payout multiplier and said wagered amount, said payout amount being greater than said wagered amount if said resulting outcome is one of said at least one winning outcome, and said payout amount being less than said wagered amount but greater than zero if said resulting outcome is one of said at least one losing outcome;

(i) updating said wagered amount based on said payout amount; and (j) repeating steps (d) through (i).

48. A medium encoded with a program for implementing a method, said program for directing a device to perform the steps of:

providing a series of outcomes, said series of outcomes including at least one winning outcome and at least one losing outcome;

providing a series of proportional payout multipliers, each corresponding to an outcome of said series of outcomes;

determining a starting credit balance;

receiving an input signal;

determining a wager amount based on said starting credit balance and said received input signal, said wager amount being in a range between some to all of said starting credit balance as selected by said input signal;

selecting, from said series of proportional payout multipliers, a resulting outcome;

selecting from said series of proportional payout multipliers a resulting proportional payout multiplier corresponding to said resulting outcome; and determining a new credit balance based on said resulting proportional payout multiplier, said starting balance and said wager amount, said new credit balance being greater than said starting credit balance if said resulting outcome is one of said at least one winning outcome, and said new credit balance being less than said starting credit balance but greater than said starting credit balance less said wager amount if said resulting outcome is one of said at least one losing outcome.

* * * * *